(12) United States Patent
Boyd et al.

(10) Patent No.: US 9,021,790 B2
(45) Date of Patent: May 5, 2015

(54) RECHARGE DEVICE AND METHOD FOR NH3 CARTRIDGE

(75) Inventors: George D. Boyd, New Palestine, IN (US); Ramon A. Mella, Greenfield, IN (US); Donald Brent Odom, Alexandria, IN (US)

(73) Assignee: International Engine Intellectual Property Company, LLc., Lisle, IL (US)

( * ) Notice: Subject to any disclaimer, the term of this patent is extended or adjusted under 35 U.S.C. 154(b) by 252 days.

(21) Appl. No.: 13/642,837

(22) PCT Filed: Apr. 21, 2011

(86) PCT No.: PCT/US2011/033400
§ 371 (c)(1),
(2), (4) Date: Apr. 2, 2013

(87) PCT Pub. No.: WO2011/133752
PCT Pub. Date: Oct. 27, 2011

(65) Prior Publication Data
US 2013/0205757 A1     Aug. 15, 2013

Related U.S. Application Data

(60) Provisional application No. 61/326,512, filed on Apr. 21, 2010.

(51) Int. Cl.
*F01N 3/00* (2006.01)
*F01N 3/20* (2006.01)
(Continued)

(52) U.S. Cl.
CPC ............... *F01N 3/208* (2013.01); *C01C 1/006* (2013.01); *F01N 2610/02* (2013.01);
(Continued)

(58) Field of Classification Search
CPC ... F01N 13/02; F01N 2550/02; F01N 11/007; F01N 3/0842; F01N 3/035; F01N 3/0814; F01N 3/2066; F01N 9/002; F02D 41/029; F02D 41/0275
USPC ................ 60/274, 273, 295, 301; 423/213.2, 423/239.1
See application file for complete search history.

(56) References Cited

U.S. PATENT DOCUMENTS

2009/0123361 A1* 5/2009 Johannessen et al. ........ 423/352
2010/0266475 A1* 10/2010 Johansen et al. ............. 423/352
(Continued)

*Primary Examiner* — Thomas Denion
*Assistant Examiner* — Patrick Maines
(74) *Attorney, Agent, or Firm* — Jeffery P. Calfa; Mark C. Bach

(57) ABSTRACT

A device and method relating to the storage and delivery of ammonia for use in an after-treatment device for $NO_x$ reduction in an exhaust stream, is disclosed. The device includes a cartridge having an ammonia adsorbing and desorbing material contained therein, and a recharging device for use in recharging the material with ammonia after the ammonia is released to a pre-determined level. The method includes providing a sealable cartridge having an interior, providing a predetermined amount of an ammonia-containing material within the interior of the container, positioning a recharging device within the interior of the sealable cartridge, releasing ammonia gas from the ammonia-containing material into an after-treatment device for use in the exhaust system of a vehicle for the reduction of $NO_x$, introducing liquid ammonia into the recharging device, and recharging the ammonia-containing material for re-use in the exhaust system.

19 Claims, 1 Drawing Sheet

(51) Int. Cl.
*C01C 1/00* (2006.01)
*B65B 3/10* (2006.01)

(52) U.S. Cl.
CPC ........ *F01N 2610/06* (2013.01); *F01N 2610/10* (2013.01); *F01N 2610/1406* (2013.01); *F01N 2450/30* (2013.01); *Y02T 10/24* (2013.01); *B65B 3/10* (2013.01)

(56) References Cited

U.S. PATENT DOCUMENTS

| | | | |
|---|---|---|---|
| 2011/0280768 A1* | 11/2011 | Kawasaki et al. | 422/111 |
| 2013/0011316 A1* | 1/2013 | Mella et al. | 423/235 |
| 2013/0118152 A1* | 5/2013 | Quaade et al. | 60/274 |
| 2014/0286829 A1* | 9/2014 | Qi | 422/110 |

* cited by examiner

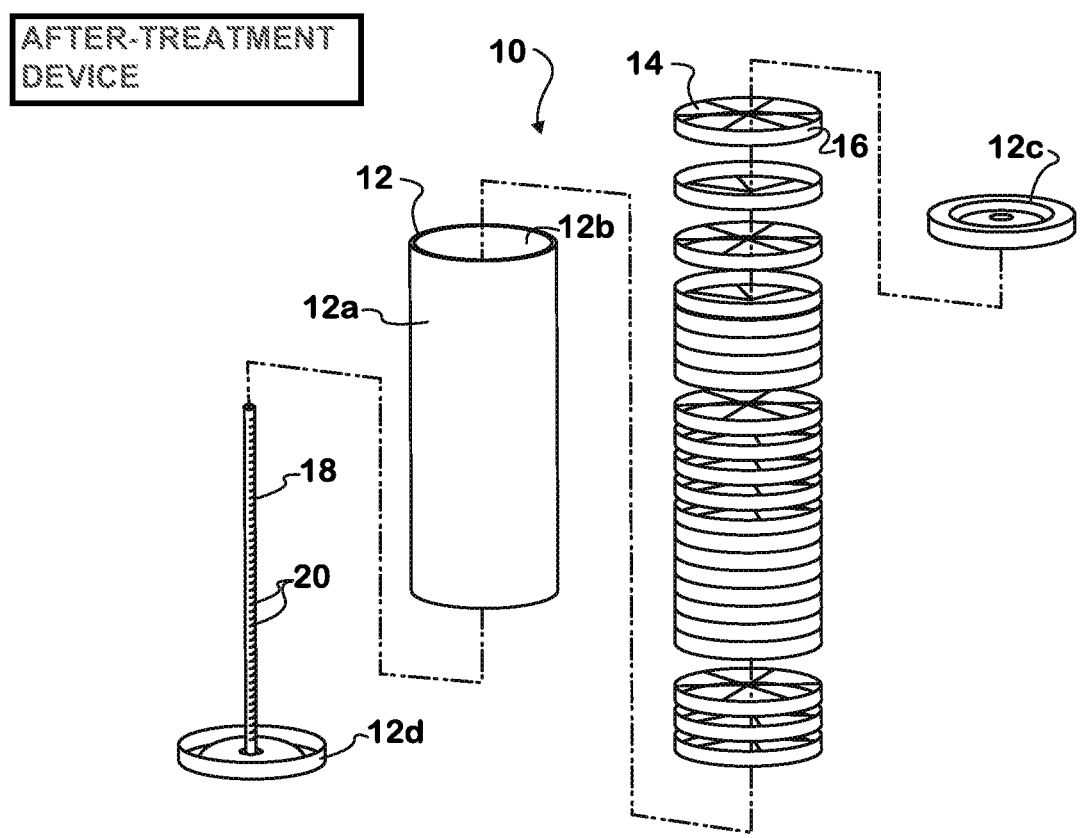

RECHARGE DEVICE AND METHOD FOR NH3 CARTRIDGE

CROSS-REFERENCE TO RELATED APPLICATIONS

This application claims the benefit of U.S. Patent Application Ser. No. 61/326,512 filed on Apr. 21, 2010.

TECHNICAL FIELD

The present device and method relate to the storage and delivery of ammonia. Particularly, the device and method relate to recharging of an ammonia adsorbing and desorbing material stored within a cartridge such that the cartridge and ammonia material stored therein can be re-used for release of gaseous ammonia for use on a vehicle in the selective catalytic reduction of $NO_x$.

BACKGROUND

Compression ignition engines provide advantages in fuel economy, but produce both $NO_x$ and particulates during normal operation. New and existing regulations continually challenge manufacturers to achieve good fuel economy and reduce the particulates and $NO_x$ emissions. Lean-burn engines achieve the fuel economy objective, but the high concentrations of oxygen in the exhaust of these engines yields significantly high concentrations of $NO_x$ as well. Accordingly, the use of NO reducing exhaust treatment schemes are being employed in a growing number of systems.

One such system is the direct addition of ammonia gas to the exhaust stream. It is an advantage to deliver ammonia directly in the form of a gas, both for simplicity of the flow control system and for efficient mixing of reducing agent, ammonia, with the exhaust gas. The direct use of ammonia also eliminates potential difficulties related to blocking of the dosing system, which are cause by precipitation or impurities, e.g., in a liquid-based urea solution. In addition, an aqueous urea solution cannot be dosed at a low engine load since the temperature of the exhaust line would be too low for complete conversion of urea to ammonia (and $CO_2$).

Transporting ammonia as a pressurized liquid, however, can be hazardous if the container bursts caused by an accident or if a valve or tube breaks. In the case of using a solid storage medium, the safety issues are much less critical since a small amount of heat is required to release the ammonia and the equilibrium pressure at room temperature can be—if a proper solid material is chosen—well below 1 bar. Ammonia can be provided in the form of disks or balls loaded into the canister. Typically, once the ammonia is used up, the canister and its contents are destroyed and recycled. Attempts have been made to recharge the ammonia; however, introduction of gaseous ammonia into a compressed material in previous techniques, typically results in very slow absorption and saturation, often taking several hours.

The present device and method of recharging or adsorbing an ammonia-containing material contained within a cartridge or canister resulting in equal distribution of the ammonia throughout the material in the cartridge. The present device and method results in a quicker, more efficient saturation and recharging of material than previous devices and methods. In this manner, cartridges and their contents can be re-used, perhaps even multiple times, resulting in cost savings for manufacture and recycling.

SUMMARY

There is disclosed herein a device and method, each of which avoids the disadvantages of prior devices and methods while affording additional structural and operating advantages.

Generally speaking, an ammonia storage material assembly comprises a cartridge and an ammonia adsorbing and desorbing material contained therein. The assembly further includes a device for introducing liquid ammonia to the ammonia adsorbing/desorbing material once it has released or desorbed its ammonia into the exhaust treatment system, for the purpose of recharging the material for re-use.

In an embodiment, there is an assembly for storing and re-charging an ammonia-containing material, the assembly comprising a cartridge having an interior and a length, a compacted ammonia-containing material stored within the interior of the cartridge, and a recharging element positioned within the interior of the cartridge and the ammonia-containing material. The recharging element, which comprises a plurality of openings along its length, is also positioned to pass through the ammonia-containing material.

In a disclosed method for recharging material for use in the reduction of $NO_x$ in an exhaust stream, the method comprises the steps of providing a sealable container having an interior, positioning a recharging device within the interior of the sealable container, providing a predetermined amount of material capable of adsorbing and desorbing ammonia within the interior of the container, heating the material and releasing ammonia gas from the material into an exhaust system of a vehicle for use in the reduction of $NO_x$, introducing liquid ammonia into the recharging device; and, recharging the material with ammonia gas.

In another embodiment, the step of recharging the material comprises passing liquid ammonia into the recharging device, through the openings of the recharging device and into the material, and saturating the material with the ammonia gas to a useable level.

In yet another embodiment, there is a method for reusing a material capable of adsorbing and desorbing ammonia for use in the reduction of $NO_x$ in an exhaust stream, the method comprising the steps of providing a sealable cartridge having an interior, providing a predetermined amount of ammonia-containing material within the interior of the container, positioning a recharging device having a plurality of openings within the interior of the sealable cartridge and through the material, applying heat to the ammonia-containing material to desorb ammonia gas from the material to a pre-determined level and into an after-treatment device for an exhaust system of a vehicle, introducing liquid ammonia into the recharging device, infusing the liquid ammonia from the openings of the recharging device and into the material, recharging the material with the liquid ammonia to a useable saturation level, and reusing the recharged material.

These and other aspects of the invention may be understood more readily from the following description and the appended drawings.

BRIEF DESCRIPTION OF THE DRAWINGS

FIG. 1 is an exploded perspective view of the assembly for storing and recharging the ammonia adsorbing/desorbing material.

DETAILED DESCRIPTION

Referring to FIG. 1, there is illustrated an assembly and method for storage, specifically in a solid form, and delivery of ammonia gas, for use in the reduction of $NO_x$ in an exhaust stream (EGNR). The present assembly, generally designated by the numeral 10, is discussed with respect to ammonia storage and delivery, specifically for supplying ammonia gas to a compression ignition engine, as well as, a device for recharging the ammonia-containing material once it has released its ammonia gas for the treatment of $NO_x$. Ammonia gas is useful in the exhaust system (not shown) of a vehicle for the reduction of $NO_x$. As the exhaust system of a vehicle, including that of a diesel engine, is well known, it will not be described in detail.

As shown in FIG. 1, the assembly 10 for storing the ammonia adsorbing/desorbing material initially comprises a cartridge 12. The cartridge 12, also known as a container or canister, can have any suitable shape, but is typically a cylindrical shape with an exterior 12a and an interior 12b. The cartridge can be sealed at both ends with a top 12c and a bottom 12d. The cartridge 12 can be constructed from any suitable material that is sturdy for loading and transporting the material. In addition, the material for constructing the cartridge 12 should ideally conduct heat, because the ammonia-containing material 14 used in the present device and method, requires heat to desorb ammonia gas from the material. Aluminum sheets are a suitable material for use in constructing the cartridge 12 in a known manner. Aluminum has a low mass density and excellent thermal conductivity.

As shown in FIG. 1, the ammonia-containing or ammonia adsorbing/desorbing material 14 may have a disk shape, which is convenient for loading into the cartridge. It should be understood that while a disk-shaped ammonia-containing material 14 is shown, the material can have any suitable form, including as compressed granules or a tight-packed powder. In addition, the material 14, particularly in a granular form, may have sheets or pieces of metal dispersed throughout the material, which increases the thermal conductivity of the material. For example, aluminum covered balls of material may be loaded into the canister, and then tightly compressed, rupturing the balls resulting in a random material/sheet metal distribution of material within the canister. Regardless of the technology used to prepare the material, and load it into the canister for use, it is important to prevent the dissipation of ammonia during the formation of the material.

Suitable material for use in the present assembly 10 include metal-ammine salts, which offer a solid storage medium for ammonia, and represent a safe, practical and compact option for storage and transportation of ammonia. Ammonia may be released from the metal ammine salt by heating the salt to temperatures in the range from 10° C. to the melting point to the metal ammine salt complex, for example, to a temperature from 30° to 700° C., and preferably to a temperature of from 100° to 500° C. Generally speaking, metal ammine salts useful in the present device include the general formula $M(NH_3)_nX_z$, where M is one or more metal ions capable of binding ammonia, such as Li, Mg, Ca, Sr, V, Cr, Mn, Fe, Co, Ni, Cu, Zn, etc., n is the coordination number usually 2-12, and X is one or more anions, depending on the valence of M, where representative examples of X are F, Cl, Br, I, $SO_4$, $MoO_4$, $PO_4$, etc. Preferably, ammonia saturated strontium chloride, $Sr(NH_3)Cl_2$, is used in creating the disk of the present assembly 10.

In order to use the ammonia of the present device assembly 10 in, for example, the treatment of $NO_x$ in a vehicle exhaust system, it is necessary to apply a sufficient amount of heat to the cartridge 12 and the ammonia-containing material 14 contained thereby desorbing the ammonia into its useful gaseous form. To assist in the release of the ammonia gas, the ammonia-containing material 14 may include a heat conductive layer or plate 16 surrounding the material. The heat conductive layer 16 may come in contact with the interior 12b of the cartridge 12 thereby generating enough heat to the ammonia-containing material to release the ammonia gas into the exhaust system. Alternatively, the ammonia-containing material may be placed inside aluminum cups, which are then sealed and stacked inside the cartridge.

Once the ammonia gas is released or desorbed from the material to a predetermined level from the ammonia-containing material 14, now an ammonia-spent or desorbed material, current practice is to destroy the cartridge 12 and recycle the material. Prior to the present recharging assembly 10, attempts to re-saturate, recharge or adsorb the material 14 with ammonia was a tedious process, often requiring an excessive amount of time, even several hours, to re-saturate the material. The present assembly 10, includes a recharging device or element 18, which is useful for recharging the material 14 while it remains within the cartridge 12. The recharging device or element 18 may be in the form of a tube, having a length equal to that of the cartridge 12, so that when the device is installed within the cartridge, it passes through the ammonia-spent material 14. It should be understood that while the recharging device is referred to as a "tube," it is not necessarily limited to a straight shape. The recharging device may include any suitable shape, including a straight shape, spiral shape, curved shape, or practically any other shape that would fit within the canister.

The device or element 18 is perforated with a plurality of openings or holes 20, which are randomly arranged along the entire length of the device. In this manner, when recharging the ammonia-desorbed material 14 with ammonia, the liquid ammonia passes through the tube, through the openings, and infuses throughout the entire length of the material. While the recharging device 18 can be installed in any position within the interior of the cartridge, central installation of the device 18 within the cartridge 12 results in distribution of the liquid radially outward and generally uniformly throughout the length of the canister or cartridge 12. While not wishing to be bound by any particular theory, it is believed that when the material is heated during use, the released ammonia leaves behind a plurality of spaces or interstices throughout the material. Upon recharging, the liquid ammonia fills the interstices left behind in the material from the desorbed ammonia, thereby recharging the material throughout. Therefore, placing the recharging device 18 within the material, whether in the center of the material or anywhere suitable based on the design of the device, it results in an efficient introduction of the liquid ammonia throughout the compressed material 14, which is more effective for recharging than passing the liquid through a nozzle (not shown) in an end cap 12c, 12d through one end of the cartridge.

The present method provides an efficient means for recharging a canister or cartridge 12 containing a ammonia-containing or ammonia adsorbing/desorbing material 14, for releasing ammonia gas for use in an after-treatment device (FIG. 1) for the reduction of $NO_x$ in the exhaust stream of a vehicle. In the present method, a sealable cartridge 12 having an interior 12b is provided. A predetermined amount of the ammonia-containing material 14, such as a suitable salt, is loaded in a suitable form within the interior of the cartridge 12 using known compacting or loading methods. A recharging device 18 having a plurality of openings 20 along a length thereof, is positioned within the interior of the sealable cartridge 12.

In order to provide efficient re-charging of the material 14 once the material has desorbed its ammonia, the recharging device 18 is also positioned through the ammonia-containing material. The method further includes the step of releasing an ammonia gas from the ammonia-containing material 14 to a predetermined level into an after-treatment device (FIG. 1) exhaust system of a vehicle (not shown), which is used in the reduction of $NO_x$ in the exhaust stream. After the ammonia gas is released or desorbed from the ammonia-containing material 14 to a desired level, the method includes recharging or adsorbing the material with ammonia so it can be used again in the exhaust treatment system, without having to remove the cartridge or its material. The recharging method includes introducing liquid ammonia into the recharging device, which may be done at a filling station, or during regular service maintenance for the vehicle. The liquid ammonia enters the recharging device 18, passes through the openings or perforations 20 in the device, and saturates into the material. The material 14, which is then recharged to a useable level, can then be re-used in the after-treatment device and system. This method provides a cost-efficient way to re-use the ammonia-containing material and its cartridge.

What is claimed is:

1. An assembly for storing and recharging ammonia for use in the treatment of $NO_x$ in an exhaust stream, the assembly comprising:
   a cartridge having an interior space;
   a compacted ammonia adsorbing/desorbing material stored within the interior space of the cartridge; and,
   a recharging element positioned within the interior space of the cartridge and the ammonia adsorbing/desorbing material.

2. The assembly of claim 1, wherein the cartridge is a cylinder.

3. The assembly of claim 1, wherein the ammonia adsorbing/desorbing material comprises a metal-ammine salt.

4. The assembly of claim 1, wherein the ammonia adsorbing/desorbing material comprises a metal-ammine salt dispersed with a heat absorbing metal.

5. The assembly of claim 4, wherein the metal-ammine salt comprises strontium chloride.

6. The assembly of claim 1, wherein the ammonia adsorbing/desorbing material is rechargeable.

7. The assembly of claim 1, wherein the recharging element is centrally located within the interior space of the cartridge.

8. The assembly of claim 1, wherein the recharging element is a tube.

9. The assembly of claim 1, wherein the recharging element is a spiral.

10. The assembly of claim 1, wherein the recharging element has a length equal to a length of the cartridge.

11. The assembly of claim 1, wherein the recharging element comprises a plurality of openings along its length.

12. A method for recharging an ammonia-containing material, the method comprising the steps of:
    providing a sealable cartridge having an interior;
    providing a predetermined amount of the material capable of adsorbing and desorbing ammonia within the interior of the cartridge;
    positioning a recharging device within the interior of the sealable cartridge and through the material;
    heating the material;
    releasing ammonia gas from the material into an after-treatment device-for use in the reduction of $NO_x$ in an exhaust stream of a vehicle;
    reducing the ammonia gas from material from an original saturation level to a pre-determined level;
    introducing liquid ammonia into the recharging device; and,
    recharging the material with ammonia.

13. The method of claim 12, wherein the method further comprises re-using the cartridge with the recharged material in the reduction of $NO_x$ in an exhaust stream.

14. The method of claim 12, wherein the recharging device comprises a plurality of openings along a length thereof.

15. The method of claim 12, wherein the step of positioning the recharging device further comprises centrally locating the recharging device within the cartridge.

16. The method of claim 15, wherein the step of positioning the recharging device further comprises passing the device centrally through the material.

17. The method of claim 12, wherein the step of recharging the material comprises introducing liquid ammonia through the recharging device.

18. The method of claim 17, wherein the step of recharging further comprises saturating the material to a re-usable level with the liquid ammonia.

19. A method for reusing a material capable of adsorbing and desorbing ammonia
    for use in the reduction of NOx in an exhaust stream, the method comprising the steps of: providing a sealable canister having an interior;
    providing a predetermined amount of an ammonia-containing material within the interior of the canister;
    positioning a recharging element having a plurality of openings along a length thereof within the interior of the sealable canister and through the ammonia-containing material;
    applying heat to the ammonia-containing material and desorbing ammonia gas from the
    material to a pre-determined level and into an after-treatment device;
    introducing liquid ammonia into the recharging element;
    infusing the liquid ammonia from the openings of the recharging element into the ammonia-containing material;
    recharging the ammonia-containing material with the liquid ammonia to a usable saturation level; and,
    re-using the recharged ammonia-containing material in the after-treatment device.

* * * * *